US009264154B1

(12) United States Patent
Laun

(10) Patent No.: US 9,264,154 B1
(45) Date of Patent: Feb. 16, 2016

(54) DYNAMIC RANGE ENHANCEMENT OF HIGH-SPEED ELECTRICAL SIGNAL DATA VIA NON-LINEAR COMPRESSION

(71) Applicant: Matthew C. Laun, Cleveland, OH (US)

(72) Inventor: Matthew C. Laun, Cleveland, OH (US)

(73) Assignee: The United States of America as Represented by the Administrator of National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 14/048,895

(22) Filed: Oct. 8, 2013

Related U.S. Application Data

(60) Provisional application No. 61/711,372, filed on Oct. 9, 2012.

(51) Int. Cl.
*H04B 3/46* (2015.01)
*H04B 17/00* (2015.01)

(52) U.S. Cl.
CPC . *H04B 17/00* (2013.01); *H04B 3/46* (2013.01)

(58) Field of Classification Search
CPC .............. H04L 1/20; H04L 1/24; H04B 3/46; H04B 17/0042; H04B 17/004; G01R 1/06766; G01R 1/06772
USPC .................................................. 375/224, 259
See application file for complete search history.

(56) References Cited

U.S. PATENT DOCUMENTS

| | | | | |
|---|---|---|---|---|
| 6,856,126 B2 * | 2/2005 | McTigue et al. | ............. | 324/72.5 |
| 7,319,341 B1 * | 1/2008 | Harms et al. | ............. | 324/754.28 |
| 7,349,097 B2 * | 3/2008 | Witzel | ............... | G01M 11/331 356/477 |
| 7,555,690 B1 * | 6/2009 | Yang et al. | ..................... | 714/742 |
| 8,874,391 B2 * | 10/2014 | Taylor | ............................. | 702/59 |
| 2003/0208734 A1 * | 11/2003 | Coelho, Jr. | ......... | G01R 31/2882 716/136 |
| 2004/0125887 A1 * | 7/2004 | Dryden | ............. | H04L 25/03343 375/296 |
| 2006/0290357 A1 * | 12/2006 | Campbell | ..................... | 324/600 |
| 2010/0305886 A1 * | 12/2010 | Zhuge | ................... | G01M 7/022 702/56 |
| 2011/0238349 A1 * | 9/2011 | Diepenbrock | ..... | G01R 31/2837 702/69 |
| 2013/0003804 A1 * | 1/2013 | Baney | ........................... | 375/224 |
| 2014/0336974 A1 * | 11/2014 | Jochen | .......................... | 702/117 |

* cited by examiner

*Primary Examiner* — Tesfaldet Bocure
(74) *Attorney, Agent, or Firm* — Robert H. Earp, III

(57) ABSTRACT

Systems and methods for high-speed compression of dynamic electrical signal waveforms to extend the measuring capabilities of conventional measuring devices such as oscilloscopes and high-speed data acquisition systems are discussed. Transfer function components and algorithmic transfer functions can be used to accurately measure signals that are within the frequency bandwidth but beyond the voltage range and voltage resolution capabilities of the measuring device.

20 Claims, 11 Drawing Sheets

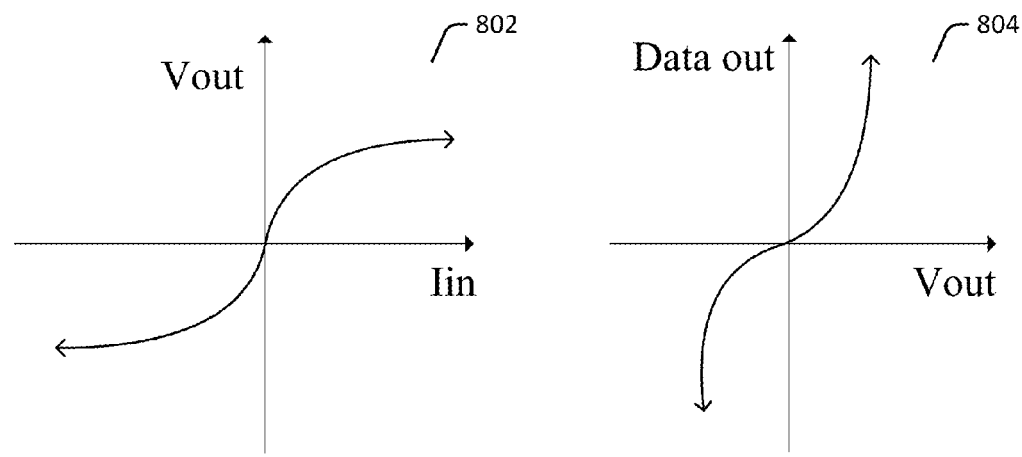
FIG. 8A
FIG. 8B
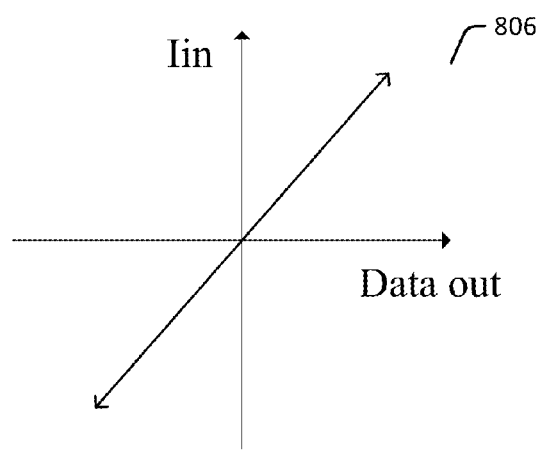
FIG. 8C

DYNAMIC RANGE ENHANCEMENT OF HIGH-SPEED ELECTRICAL SIGNAL DATA VIA NON-LINEAR COMPRESSION

CROSS-REFERENCE TO RELATED APPLICATIONS

This application claims the benefit of U.S. Provisional Patent application Ser. No. 61/711,372 entitled Dynamic Range Enhancement of High-Speed Data Acquisition Systems by Reversible Non-Linear Amplitude Compression filed Oct. 9, 2012. The entirety of the above-noted application is incorporated by reference herein.

FIELD OF THE INVENTION

This application relates generally to high-speed, non-linear compression of dynamic electrical signal waveforms to extend the measuring capabilities of conventional linear measuring devices such as oscilloscopes and high-speed data acquisition systems.

BACKGROUND

Complex electronic designs are driving innovation across many industries today. Digital Storage Oscilloscopes (DSO) and high-speed Data Acquisition Systems (DAS) are basic tools for designing, manufacturing and repairing electronic equipment. As the eyes of the engineer, oscilloscopes and DAS's are the key to meeting today's demanding measurement challenges. An oscilloscope or DAS acquires and stores electrical waveforms and can display that analog signal's amplitude and frequency content. This information can reveal a high-speed phenomenon that is too fast for the eyes, help determine whether a malfunctioning component is distorting a signal, how much of a signal is noise, whether the noise changes with time, and more.

The oscilloscope's fundamental ability to accurately measure an analog signal is determined simultaneously by several factors. Those include the voltage amplitude range, the voltage resolution, the maximum analog frequency (or analog bandwidth), and the digitizer sampling rate (also known as bandwidth). When an oscilloscope's analog bandwidth and/or sampling rate is too low for the analog signal that is being captured, the oscilloscope will not be able to resolve high-frequency content and rapid amplitude changes. If the oscilloscope's voltage resolution is not high enough, the amplitude content of the analog signal will be distorted and the low-level details of the signal will be suppressed below the background and quantization noise floor. That information will be lost and the acquired signal rendered unusable, particularly for non-repetitive signals or unique transient signal events.

In general, oscilloscopes can accurately resolve the amplitude of a constant-frequency, sinusoidal wave signal up to a significant fraction of the analog bandwidth of the oscilloscope. Above that frequency, the amplitude accuracy decreases with increasing frequency. Entry-level oscilloscopes typically have a maximum analog bandwidth of 100 MHz which yields satisfactory sinusoidal accuracy up to 20 MHz. For digital signals, such as a square wave, oscilloscopes must capture an analog bandwidth much higher than that required by a sinusoid wave. Square waves include all odd harmonics of the fundamental square wave frequency. The oscilloscope must be able to acquire the first, third, fifth, seventh, and ninth harmonics of the square wave signal or the displayed waveform will lose key features and may not be enough to represent the original signal. Capturing high-speed digital, serial communications, video and other complex signals can require oscilloscope analog bandwidths of 500 MHz or more.

Unfortunately, oscilloscopes having a high bandwidth can be cost prohibitive. Further, oscilloscopes having both a high bandwidth and a high voltage resolution are even more costly, rare, or even unavailable within the current state-of-the-art. Furthermore, an oscilloscope requires a probe to obtain the electrical signal from a device-under-test (DUT) before it is acquired and recorded. Probes that are useful for measuring large voltage or large current signals do not typically offer the high-frequency bandwidth to accurately measure rapid amplitude changes. Probes that have high bandwidths that are useful for measuring fast signals with rapid amplitude changes, often cannot tolerate voltages higher than 1 volt without the use of an attenuator which may introduce amplitude and frequency distortions.

SUMMARY

The following presents a simplified summary in order to provide a basic understanding of some aspects of the disclosure. This summary is not an extensive overview of the disclosure. It is not intended to identify key/critical elements or to delineate the scope of the disclosure. Its sole purpose is to present some concepts of the disclosure in a simplified form as a prelude to the more detailed description that is presented later.

The disclosure disclosed and claimed herein, in aspects thereof, includes systems and methods that facilitate high-speed, non-linear compression of dynamic signal waveforms to enhance or extend the range of a conventional measurement and acquisition device. One such method for measuring an electrical signal utilizing a data acquisition device can include the steps of obtaining an electrical signal with a probe, altering a portion of the electrical signal utilizing a transfer function component, conveying the altered electrical signal to the data acquisition device, applying an algorithmic inverse transfer function to restore the electrical signal waveform, and outputting an electrical signal measurement based on the restored electrical signal waveform.

In another aspect, the disclosure may include systems for measuring an electrical signal utilizing a data acquisition device that can include a probe that obtains an electrical signal waveform and conveys the electrical signal waveform to the data acquisition device, a transfer function component that alters at least a portion of the electrical signal waveform, an algorithmic inverse transfer function that comprises an inverse of the transfer function component and that restores an altered portion of the electrical signal waveform, and an output component that provides an electrical signal measurement based on the restored electrical waveform.

To accomplish the foregoing and related ends, certain illustrative aspects of the disclosures are described herein in connection with the following description and the annexed drawings. These aspects are indicative, however, of but a few of the various ways in which the principles of the disclosure can be employed and the subject disclosure is intended to include all such aspects and their equivalents. Other advantages and novel features of the disclosure will become apparent from the following detailed description of the disclosure when considered in conjunction with the drawings.

BRIEF DESCRIPTION OF THE DRAWINGS

FIG. 8A is a graph illustrating an example transfer function in accordance with an embodiment of the disclosure.

FIG. 8B is a graph illustrating an example algorithmic inverse transfer function in accordance with an embodiment of the disclosure.

FIG. 8C is a graph illustrating example restored data in accordance with an embodiment of the disclosure.

DETAILED DESCRIPTION

Figure 1:
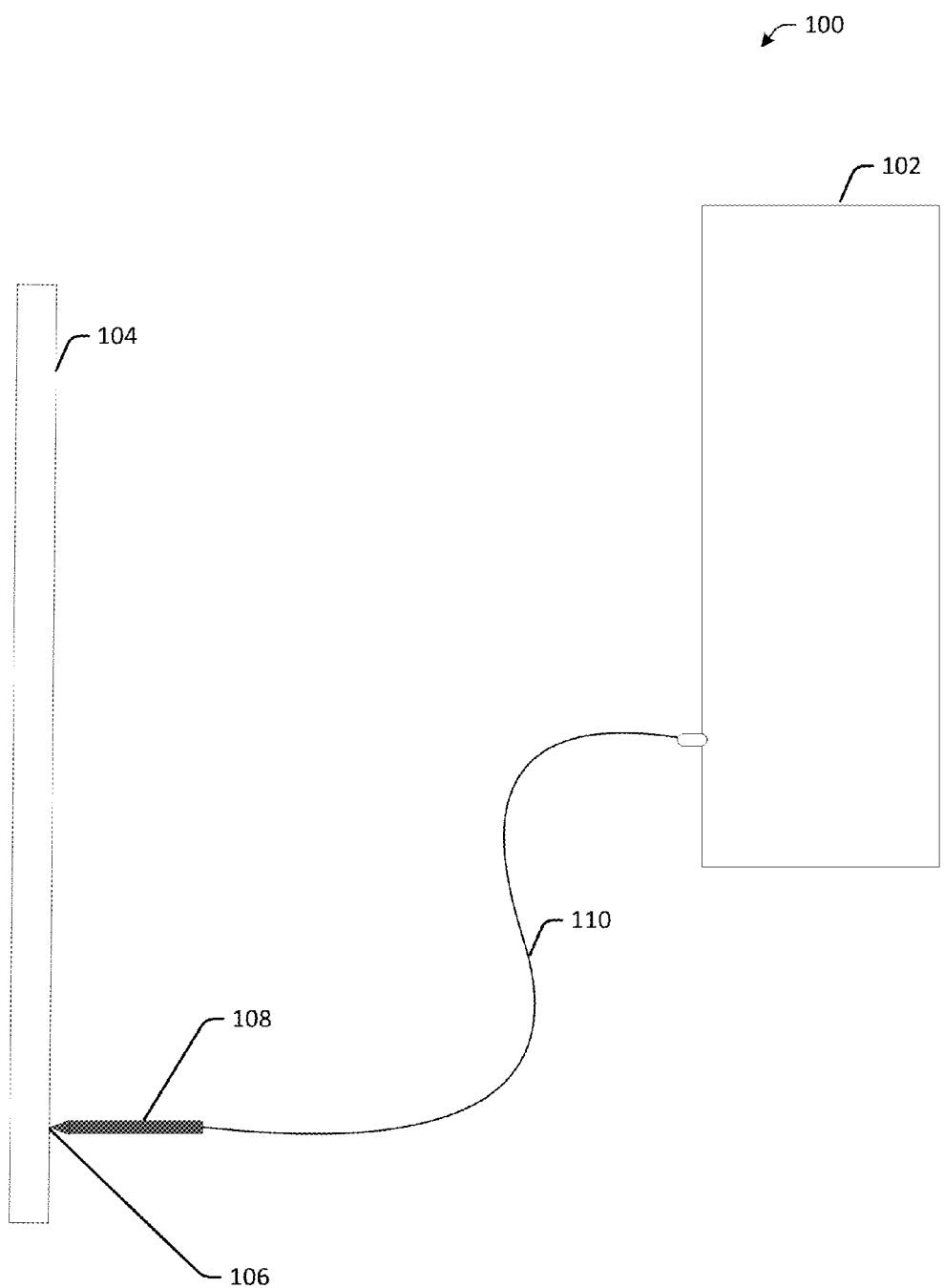
FIG. 1 is an illustration of an example system for high-speed voltage compression for dynamic range enhancement in accordance with one or more aspects of the disclosure.

The disclosure is now described with reference to the drawings, wherein like reference numerals are used to refer to like elements throughout. In the following description, for purposes of explanation, numerous specific details are set forth in order to provide a thorough understanding of the disclosure. It may be evident, however, that the disclosure may be practiced without these specific details. In other instances, well-known structures and devices are shown in block diagram form in order to facilitate describing the disclosure.

As used in this application, the terms "component", "system" and "function" are intended to refer to either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server may be a component. One or more components may reside within a process and/or thread of execution, and a component may be localized on one computer and/or distributed between two or more computers.

For the purposes of this disclosure, the terms "oscilloscope", "data acquisition system", "measuring device" and "data acquisition device" are used interchangeably and refer to most any digital oscilloscope, high-speed data acquisition system, or other device or system for the acquisition, measurement or storage of electrical signal waveform data.

While specific characteristics are described herein, it is to be understood that the features, functions and benefits of the disclosure can employ characteristics that vary from those described herein. These alternatives are to be included within the scope of the disclosure and claims appended hereto.

For purposes of simplicity of explanation, the one or more methodologies shown herein, are shown and described as a series of acts, it is to be appreciated that the subject disclosure is not limited by the order of acts, as some acts may, in accordance with the disclosure, occur in a different order and/or concurrently with other acts from that shown and described herein. For example, those skilled in the art will understand that a methodology could alternatively be represented as a series of interrelated acts or events. Moreover, not all illustrated acts may be required to implement a methodology in accordance with the disclosure.

Bandwidth is the range of signal frequencies that an oscilloscope or probe is designed for. For example, a 100 MHz probe or oscilloscope is designed to make signal measurements within a particular amplitude accuracy specification on all frequencies up to 100 MHz. Measurement results will perform with significantly reduced accuracy at signal frequencies above the specified bandwidth. As a general rule, for amplitude measurements with typical accuracy expectations, the bandwidth of the oscilloscope should be five times greater than the frequency of the waveform being measured. This "five-times rule" ensures adequate bandwidth for the higher frequency components of non-sinusoidal waveforms, such as square waves produced by digital systems.

Similarly, the oscilloscope must have an adequate voltage rise-time for the waveforms being measured. The rise-time of an oscilloscope or probe is defined as the rise-time that would be measured if an ideal, instantaneous-rise pulse (or step function) were applied. For reasonable accuracy in measuring pulse rise or fall times, the rise time of the probe and oscilloscope together should be three to five times faster than that of the pulse being measured.

Commercially available, high-performance oscilloscopes can range in price from $12,000 to $300,000. The measuring capabilities, or specifications, of a $300,000 scope can include an analog bandwidth of 33 GHz, and a sample rate of 50 Giga-Samples/second. By comparison, the measuring capabilities of a $12,000 oscilloscope can include an analog bandwidth of 100 MHz, and a sample rate of 2.5 Giga-Samples/second.

The disclosed system and method functions in conjunction with an oscilloscope or data acquisition system (DAS) as part of a measurement system that extends the low-level amplitude measurement accuracy of that particular oscilloscope or DAS while preserving the electrical signal waveform bandwidth. The disclosed system and method utilize signal compression to enhance the dynamic range of conventional data acquisition systems. For example, a lower-cost oscilloscope having an analog bandwidth of 100 MHz, a sample rate of 2.5 Giga-Samples/second, and a voltage resolution of 8 bits can be used to accurately measure electrical waveform amplitude data that are outside of its specified measuring capabilities for voltage range and voltage resolution. The disclosed system and method can be used to implement compression of electrical signals that include frequency content that exceeds 200 kHz up to about 1 GHz, while retaining amplitude precision.

Conventional data acquisition systems are well-suited for typical linear data acquisition involved in measuring expected electrical signal waveform data such as sine waves, square waves, triangle waves, saw tooth waves, and the like. However, commonly available data acquisition systems are not capable of accurately measuring rapid, dynamic transients, or pulses, which contain a dynamic range and/or a crest factor beyond the measuring capabilities of the data acquisition system.

The disclosed system and method are useful for the measurement of rapid, dynamic transients, or pulses, which contain a dynamic range and/or a crest factor that is too high to be accurately represented by commonly available data acquisition systems of comparable bandwidth. For example, although a conventional data acquisition system with an adequate dynamic range represented by 24 bits may be able to simultaneously measure high voltages and low voltages, it would only have the bandwidth and speed (200K to 2M-Samples/second) to measure slower signals (40 KHz to 400 KHz); not a high-speed transient on the order of 1-100 nanoseconds duration (10 MHz to 1 GHz). Conversely, a conventional DAS with adequate bandwidth and high-speed (2G to 20G-Samples/second) would only have a minimal dynamic range represented by 8 bits and would not be able to simultaneously resolve low and high level amplitudes in the signal.

The disclosed system and method of high-speed current and voltage compression provides dynamic range enhancement for conventional data acquisition systems for the accurate measurement of fast electrical signal waveform data that is beyond the measuring capabilities of the conventional data acquisition system.

With reference now to the figures. FIG. 1 illustrates an overview of an example system 100 for measuring electrical signal waveform data utilizing high-speed current or voltage compression for dynamic range enhancement of a data acquisition device according to one or more embodiments. FIG. 1 includes a simplified view of a measuring device 102, a device under test 104, a test point 106, a probe 108 and a probe cable 110.

In accordance with an embodiment, a probe 108 can be electrically coupled to a measuring device 102 via a probe cable 110. The probe 108 facilitates a physical and electrical connection between the measuring device 102 and a test point 106 of the device under test 104. The probe cable 110 allows the measuring device 102 to be left in a stationary position while the probe is moved from one test point 106 to another of the device under test 104.

Figure 2:
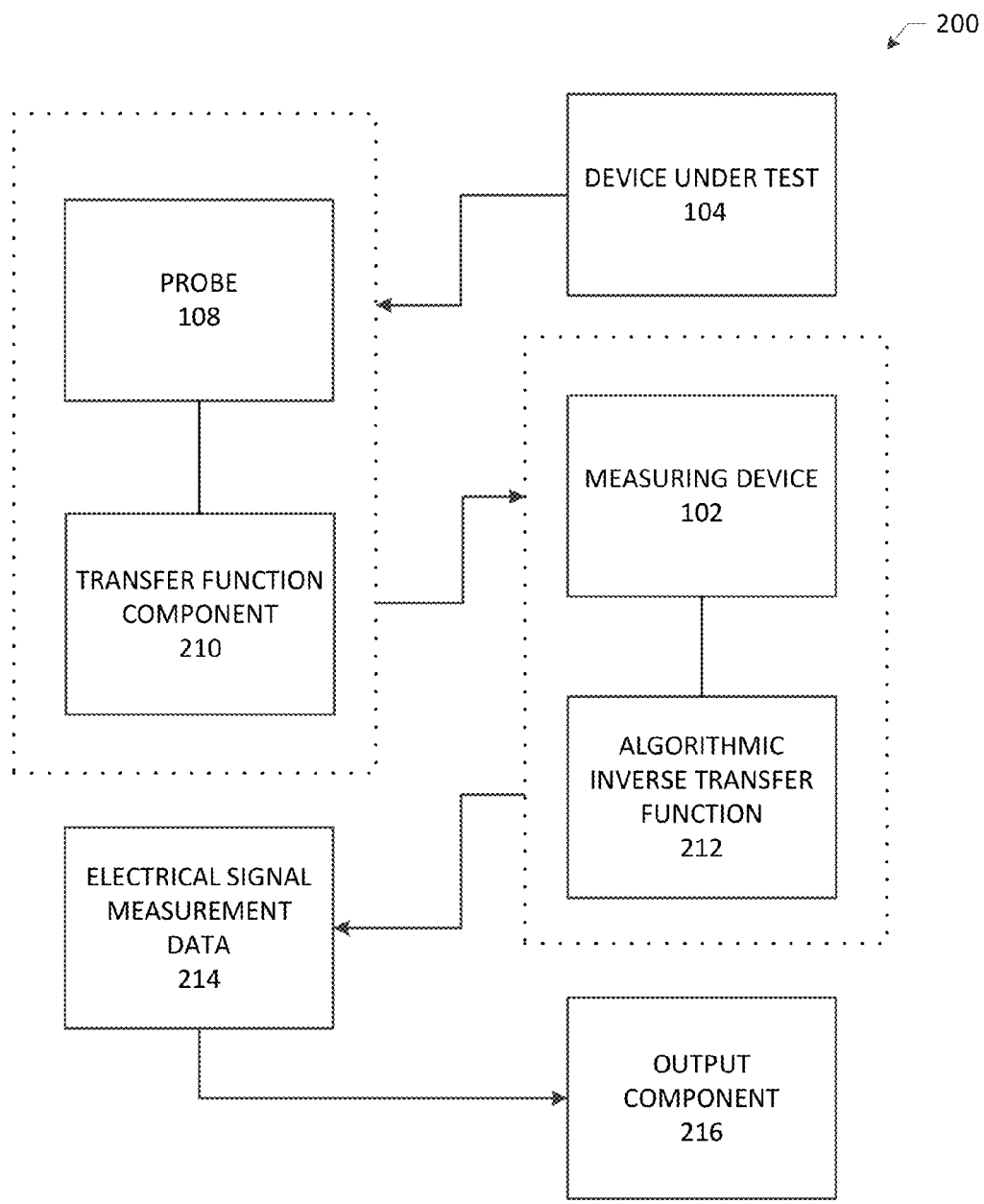
FIG. 2 is an illustration of an example system for high-speed current or voltage compression for dynamic range enhancement in accordance with one or more aspects of the disclosure.

FIG. 2 is an illustration of an example system 200 for measuring electrical signal waveform data utilizing a measuring device according to one or more embodiments. The system 200 may include a measuring device 102, a device under test 104, a probe 108, a transfer function component 210, an algorithmic inverse transfer function 212, electrical signal measurement data 214 and an output component 216.

Transfer function component 210 can be applied to an electrical signal waveform acquired via probe 108 at test point 106 of the device under test 104. A transfer function component 210 can be implemented utilizing commercially available electronic components or circuits, for example, resistors, diodes, Schottky diodes (e.g. Panasonic® DB2S308, Diodes, Inc.® N5817), and integrated circuits, for example, high-frequency, low-voltage operational amplifiers and other operational amplifiers. The configuration of the transfer function component 210 can be customized based on the electrical signal waveform from device under test 104 to be measured or acquired and the measuring capabilities or specifications of the measuring device 102. An example transfer function component 210 can accomplish pseudo-logarithmic compression of acquired electrical signal waveform using high-speed, passive diodes buffered with an active high-speed operational amplifier with differential cable-driving capability.

In an embodiment, transfer function component 210 can shift the amplitude of the measured signal downwards in the vertical range to an intermediate level that is within the measuring capabilities of the measuring device 102. Simultaneously, transfer function component 210 can adjust the rate of amplitude shifting with respect to the absolute input signal level. The consequence is less shifting for low-level signals and greater shifting for large signals. The action upon the signal can be considered pseudo-logarithmic compression.

Transfer function component 210 can take the form of an electronic circuit and can be implemented at probe 108. In an embodiment, the electrical signal waveform is obtained at the probe tip of probe 108. The electrical signal waveform can be altered or compressed as it passes through the transfer function component 210. The altered electrical signal waveform can be conveyed to the measuring device 102 via probe cable 110.

In accordance with an embodiment, algorithmic inverse transfer function 212 is based precisely on the actual transfer function component 210. Algorithmic inverse transfer function 212 can be the inverse or mirror image of the transfer function component 210. The complexity, or simplicity, of the algorithmic inverse transfer function 212 can be determined by the components used in the transfer function component 210.

Algorithmic inverse transfer function 212 can be applied to the altered or compressed electrical signal waveform to restore the original electrical signal waveform obtained from the device under test 104. Electrical signal measurement data 214 can be based on the restored electrical signal waveform.

In an embodiment, algorithmic inverse transfer function 212 can be implemented in software and can be a software application running on the measuring device 102. An algorithmic inverse transfer function 212 can be implemented in software or firmware.

In an embodiment, the algorithmic inverse transfer function 212 can be an amplitude correction implemented via an algebraic equation (e.g. multi-order polynomial equation). The altered or compressed electrical signal waveform data can be multiplied by co-efficients and shifted by offsets to restore the original electrical signal waveform. The algorithmic inverse transfer function 212 can also take the form of a modified exponential operation with fewer co-efficients and shorter computational time. The algorithmic inverse transfer function 212 can also take the form of a memorized "look-up table" from a prior calibration procedure without the need for math operations, thus facilitating faster performance.

In an embodiment, output component 216 can be a display of an oscilloscope or a display associated with a high-speed data acquisition system or other measuring device 102. Electrical signal measurement data 214, based on the restored electrical signal waveform can be displayed by output component 216.

Figure 3:
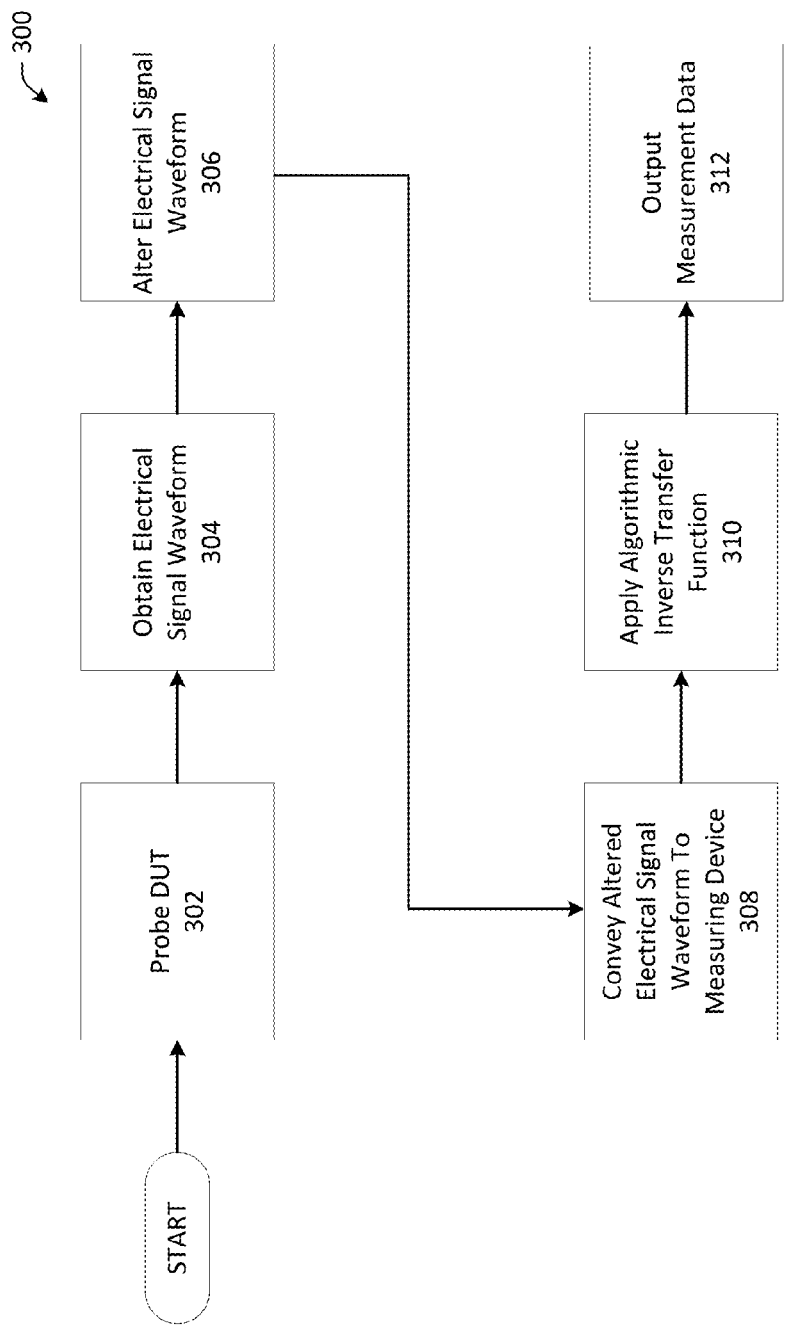
FIG. 3 is an illustration of an example flow chart of a method for high-speed current or voltage compression for dynamic range enhancement, according to one or more embodiments.

FIG. 3 illustrates a computer-assisted method 300 for high-speed current or voltage compression for dynamic range enhancement of a measuring device in accordance with aspects of the disclosure. The disclosure is not limited by the order of acts, as one or more acts may, in accordance with the disclosure, occur in a different order and/or concurrently with other acts from that shown and described herein.

Method 300 may begin at act 302, a probe 108 can be physically and/or electrically connected to a test point 106 of a device under test 104. At act 304, an electrical signal waveform is obtained from the device under test 104.

At act 306, a transfer function 210 is applied to the electrical signal waveform. In an embodiment, transfer function component 210 can alter or compress the electrical signal waveform. The transfer function component 210 can take the form of an electronic circuit and, in an embodiment, can be implemented at the probe 108.

At act 308, the electrical signal waveform that has been altered by the transfer function component 210 can be conveyed from the probe 108 to the measuring device 102. In an embodiment, the electrical signal waveform is conveyed from the probe 108 to the measuring device 102 via probe cable 110.

At act 310, an algorithmic inverse transfer function 212 can be applied to the electrical signal waveform that has been altered by the transfer function component 210, and acquired by the measuring device 102, to restore the electrical signal waveform acquired from the device under test 104. Electrical signal measurement data 214 can be based on the restored electrical signal waveform.

In accordance with an embodiment, act 310 can include a calibration step that may include spectral analysis and/or frequency transforms that compensate for temporal dependencies introduced by transfer function component 210. In an embodiment, an automated calibration step can be implemented in software running on the measuring device 102.

At act 312, the electrical signal measurement data 214 can be an output, for example, on the display of an oscilloscope or a display associated with a high-speed data acquisition system or other measuring device 102.

Figure 4A:
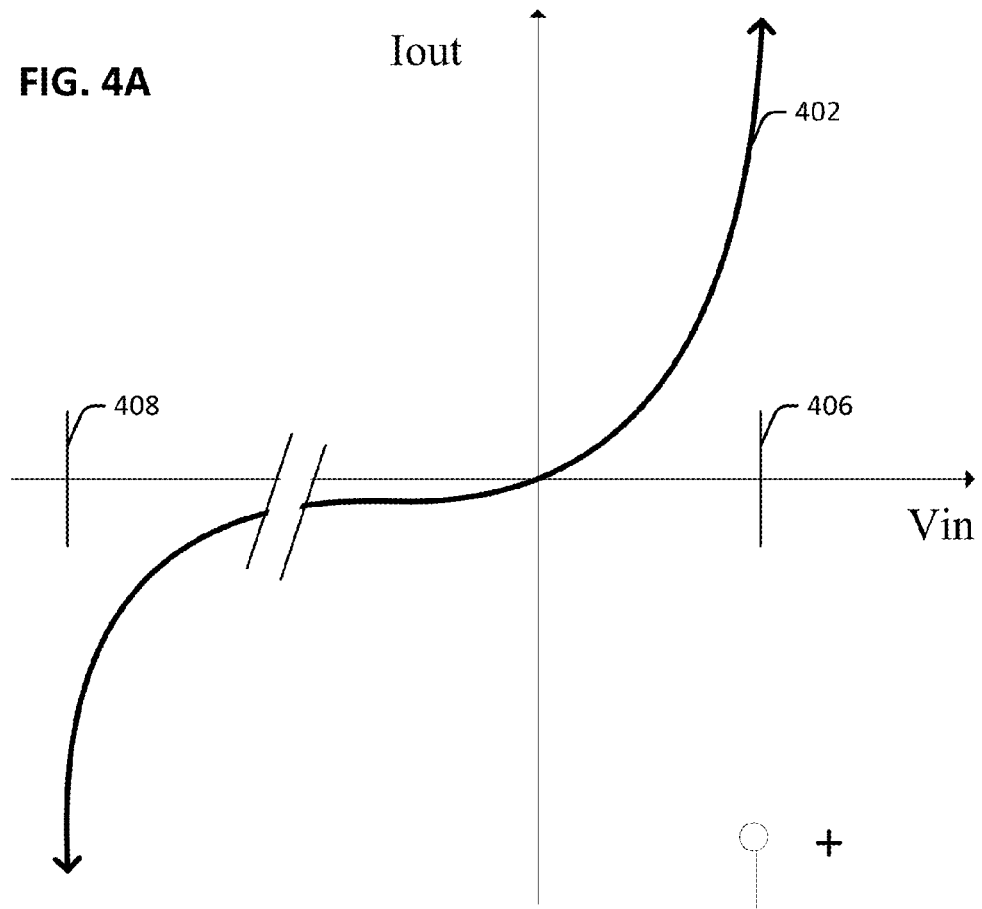
FIG. 4A is an illustration of an example transfer function in accordance with an embodiment of the disclosure.
Figure 4B:
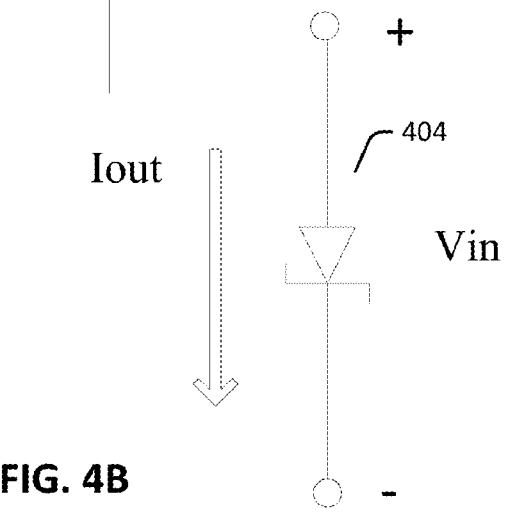
FIG. 4B is a graph illustrating an example transfer function component schematic in accordance with an embodiment of the disclosure.

FIG. 4A is a graph illustrating an example transfer function of the transfer function component illustrated in FIG. 4B. The transfer function is represented by graphed line 402 in FIG. 4A. The simplified diode model parameter ($V_T$) 406 is approximately 0.2 VDC. The simplified diode model parameter ($-V_Z$) 408, known as the Zener effect, or reverse breakdown voltage is approximately 20-30 VDC. Typically $V_T < V_Z$.

The transfer function component illustrated in FIG. 4B can be implemented, for example, utilizing a commercially-available Schottky diode 404 (e.g. Panasonic® DB2S308, Diodes, Inc. ° IN5817) in accordance with an embodiment of the disclosure.

Figure 5A:
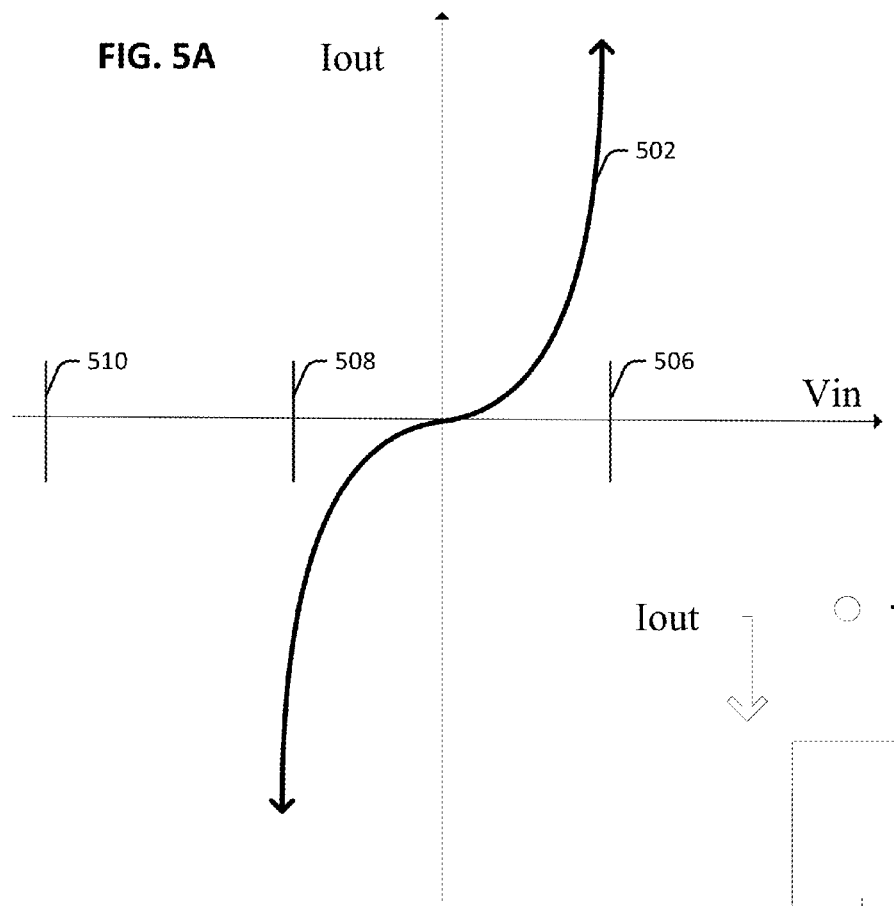
FIG. 5A is an illustration of an example transfer function in accordance with an embodiment of the disclosure.
Figure 5B:
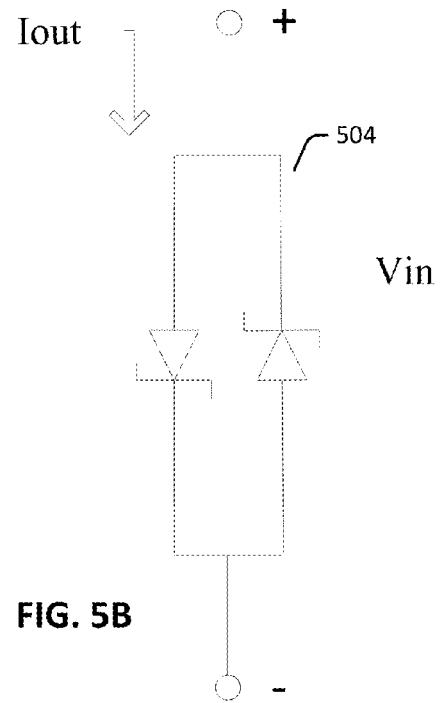
FIG. 5B is a graph illustrating an example transfer function component schematic in accordance with an embodiment of the disclosure.

FIG. 5A is a graph illustrating an example voltage-mode transfer function of the voltage-mode transfer function component illustrated in FIG. 5B. The voltage-mode transfer function is represented by graphed line 502. Simplified diode model parameters are indicated as ($V_T$) 506 and ($-V_T$) 508, typically 0.2 VDC and –0.2 VDC respectively. The simplified diode model parameter ($-V_Z$) 408, or reverse breakdown voltage, is approximately 20-30 VDC. In practice, $\pm V_Z$ would be unattainable in the anti-parallel configuration and can be neglected.

The voltage-mode transfer function component illustrated in FIG. 5B can be implemented, for example, utilizing two, anti-parallel Schottky diodes 504 in accordance with an embodiment of the disclosure.

Figures 6A, 6B:
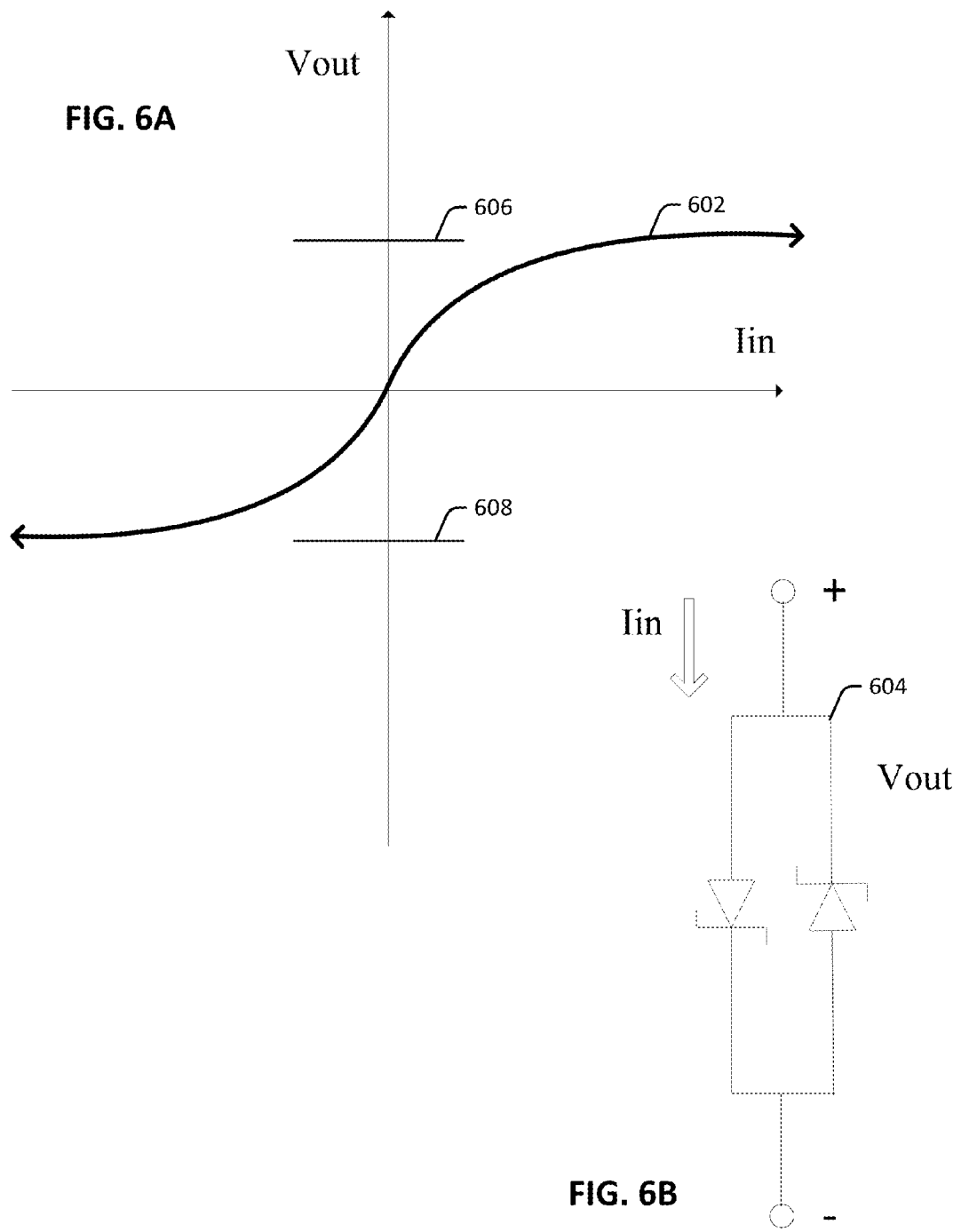
FIG. 6A is an illustration of an example transfer function in accordance with an embodiment of the disclosure.
FIG. 6B is a graph illustrating an example transfer function component schematic in accordance with an embodiment of the disclosure.

FIG. 6A is a graph illustrating an example current-mode transfer function of the transfer function component illustrated in FIG. 6B. The current-mode transfer function is represented by graphed line 602. Diode model parameters are indicated as ($V_T$) 606 and ($-V_T$) 608, 0.2 VDC and –0.2 VDC respectively.

The current-mode transfer function component illustrated in FIG. 6B can be implemented, for example, utilizing two, anti-parallel Schottky diodes 604 in accordance with an embodiment of the disclosure.

Figure 7A:
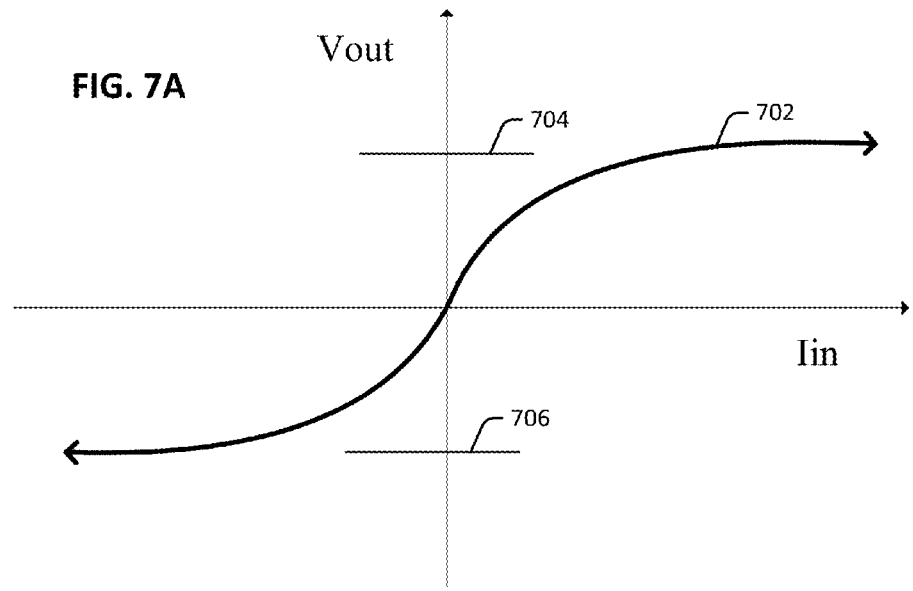
FIG. 7A is an illustration of an example transfer function in accordance with an embodiment of the disclosure.
Figure 7B:
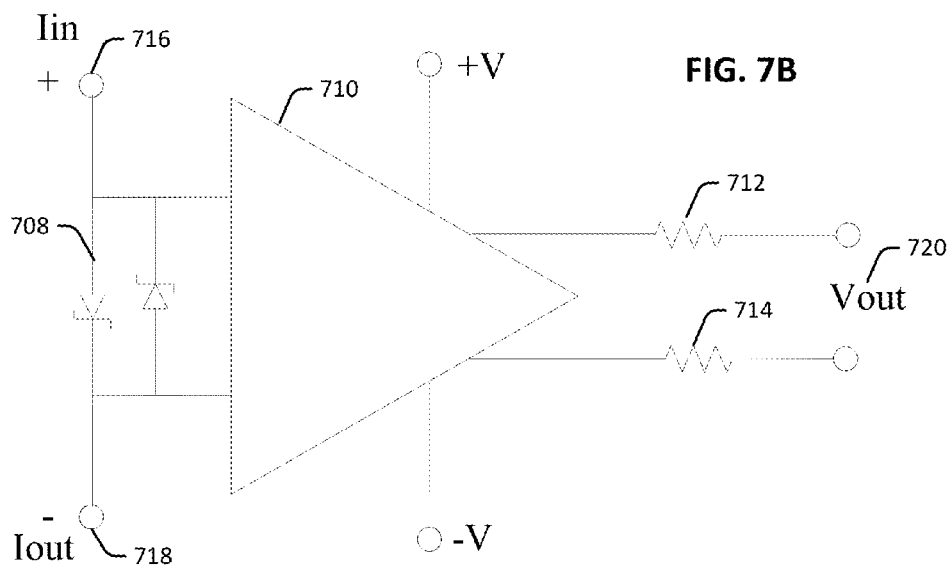
FIG. 7B is a graph illustrating an example transfer function component schematic in accordance with an embodiment of the disclosure.

FIG. 7A is a graph illustrating an example current-mode transfer function of the current-mode transfer function component illustrated in FIG. 7B. The current-mode transfer function is represented by graphed line 702. Simplified diode model parameters are indicated as ($V_T$) 704 and ($-V_T$) 706, 0.2 VDC and –0.2 VDC respectively.

The current-mode transfer function illustrated in FIG. 7A can be implemented as a transfer function component, for example, utilizing two, closely matched Schottky diodes 708, a high-frequency, low voltage operational amplifier 710, and cable-impedance-matching resistors 712, 714 as shown in FIG. 7B. The current input 716 and current output 718 are electrically connected to the two, closely matched Schottky diodes 708, and to the input of the high-frequency, low voltage operational amplifier 710. The current input 716 can be limited to the maximum current rating, $I_{max}$, of the diodes 708. The outputs of the operational amplifier 710 are connected to 50 ohm resistors 712, 714. The output of transfer function component 704 is differential voltage output 720.

FIG. 8A illustrates an example transfer function graph 802. FIG. 8B illustrates an example algorithmic inverse transfer function graph 804. FIG. 8C illustrates an example restored linear function graph 806 in accordance with an embodiment. The original electrical signal waveform is intentionally altered or distorted utilizing a transfer function component 210 as illustrated in graph 802 of FIG. 8A. The characteristics of the alterations or distortions are known by the components chosen to implement the transfer function component 210.

Algorithmic inverse transfer function 212, as illustrated in graph 804 of FIG. 8B, is based on, and can be the inverse of, the transfer function component 210. An algorithmic inverse transfer function 212 can be applied to the electrical signal waveform that has been altered by the transfer function component 210 to recover or restore the original electrical signal waveform, as illustrated in graph 806 of FIG. 8C.

Figure 9:
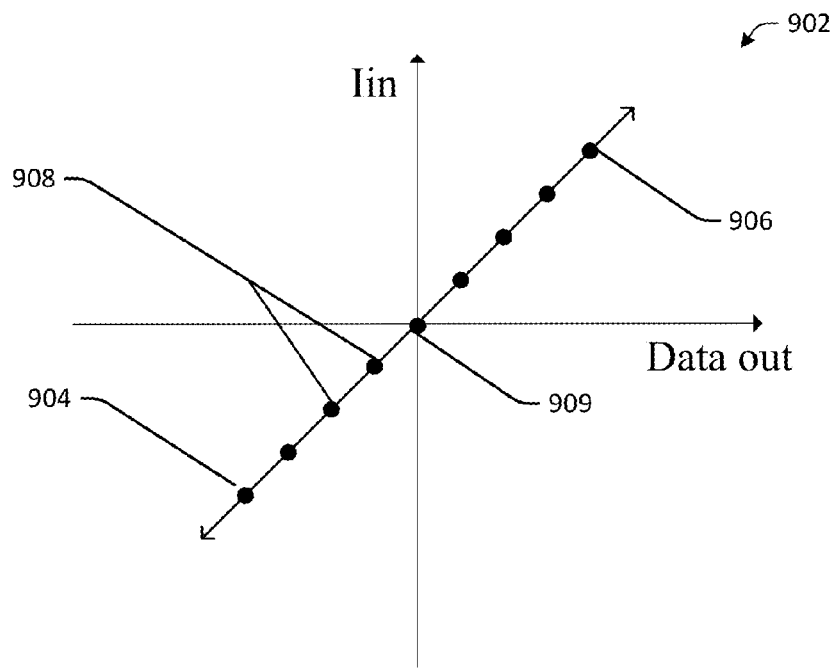
FIG. 9 is a graph illustrating a comparison of data measurement resolution in accordance with embodiments of the disclosed system and method.
Figure 9:
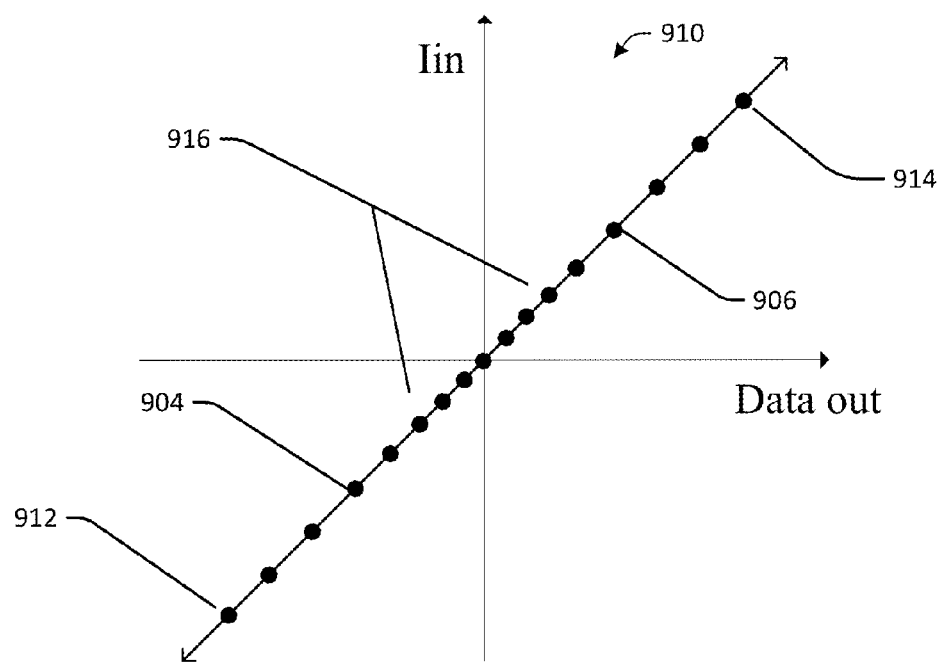

FIG. 9 is a graph 902 illustrating traditional linear data acquisition, and a graph 910 illustrating data acquisition utilizing the disclosed pseudo-logarithmic compression using passive diodes. The traditional linear data acquisition is accomplished utilizing an 8-bit data acquisition system, sampling at high speed (1G to 20GSamples/second). The linear range minimum 904 and linear range maximum 906 are indicated. The fixed, quantized data points 908 are evenly spaced and lack fine resolution at low signal levels 909. Those attributes demonstrate the limitations of a typical, 8-bit, linear data acquisition system.

Data acquisition utilizing the disclosed pseudo-logarithmic compression using passive diodes, as illustrated by graph 910, provides increased range, as demonstrated by pseudo-logarithmic minimum range 912 and pseudo-logarithmic maximum range 914. For comparison, the linear range minimum 904 and linear range maximum 906 of traditional linear data acquisition are included on graph 910. The disclosed system and method of pseudo-logarithmic compression using passive diodes, illustrated in graph 910, provides enhanced resolution at low signal levels 916. The quantized data points are distributed unevenly within the range and shift available information density from the high to the low signal levels, thus increasing low level resolution. The disclosed system and method can be used with traditional 8-bit data acquisition systems to provide accurate measurement of electrical signal waveform data that are beyond the measuring capabilities of the linear 8-bit data acquisition system by itself.

Figure 10A:
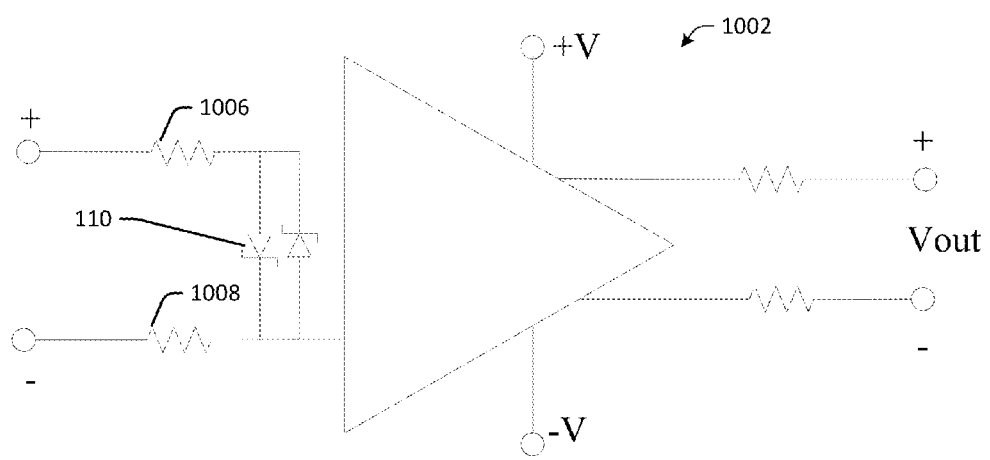
FIG. 10A is an illustration of an example transfer function component schematic in accordance with embodiments of the disclosed system and method.
Figure 10B:
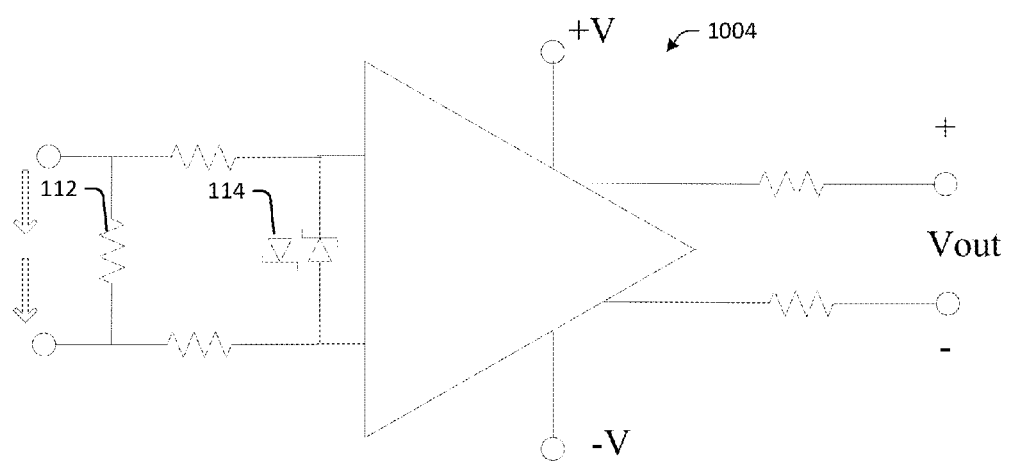
FIG. 10B is an illustration of an example transfer function component schematic in accordance with embodiments of the disclosed system and method.

FIGS. 10A and 10B are schematics of example transfer function components 1002, 1004 in accordance with embodiments of the disclosed system and method. FIG. 10A is a schematic of an example voltage-mode transfer function component 1002. Transfer function component 1002 accepts an electric voltage input and produces a differential voltage output. Resistors 1006, 1008 can be selected to match the input voltage range to the current-voltage characteristics (or I-V curve) of the diodes 110.

FIG. 10B is a schematic of an example extended-range, current-mode transfer function component 1004. Transfer function component 1004 accepts an electrical current input and produces a differential voltage output. Resistor 112 can be a precision shunt resistor and can be selected to scale a large current input to match the current-voltage characteristics (or I-V curve) of the diodes 114.

Figure 11:
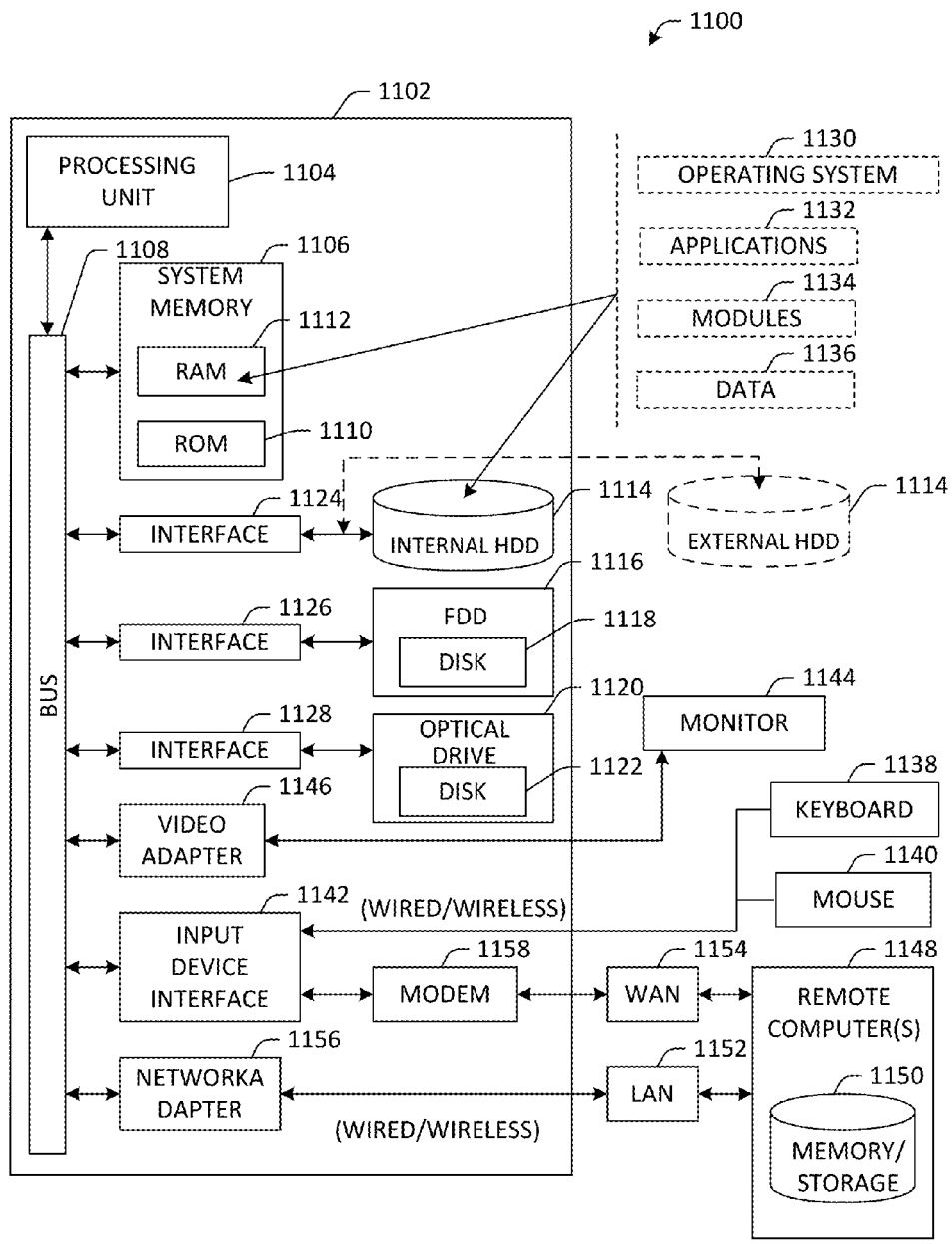
FIG. 11 is an illustration of an example computing environment where one or more of the provisions set forth herein are implemented, according to one or more embodiments.

FIG. 11 and the following discussion provide a description of a system and suitable computing environment in which embodiments of one or more of the provisions set forth herein may be implemented.

FIG. 11 illustrates a system 1100 including a computing device configured to implement one or more embodiments provided herein. In one configuration, the computing device may include at least one processing unit 1102 and memory 1104. Depending on the configuration and type of computing device, memory 1104 may be volatile, such as RAM, non-volatile, such as ROM, flash memory, etc., or a combination of the two. This configuration is illustrated in FIG. 11 by dashed line 1106.

The system 1100 may include one or more input devices 1108 such as keyboard, mouse, pen, audio or voice input device, touch input device, infrared cameras, video input devices, gesture recognition module, or any other input device.

In embodiments, the system 1100 may include additional input devices 1108 to receive input from a user. User input devices 1108 may include, for example, a push button, touch pad, touch screen, wheel, joystick, keyboard, mouse, keypad, or most any other such device or element whereby a user may input a command to the system. Input devices may include a microphone or other audio capture element that accepts voice or other audio commands. For example, a system might not include any buttons at all, but might be controlled only through a combination of gestures and audio commands, such that a user may control the system without having to be in physical contact with the system.

One or more output devices 1110 such as one or more displays or most any other output device may be included in system 1100. The one or more input devices 1108 and/or one or more output devices 1110 may be connected to system 1100 via a wired connection, wireless connection, or any combination thereof. System 1100 may also include one or more communication connections 1112 that may facilitate communications with one or more devices including computing devices 1111 by means of a communications network 1116.

Communications network 1116 may be wired, wireless, or any combination thereof, and may include ad hoc networks, intranets, the Internet, or most any other communications network that may allow system 1100 to communicate with computing device 1118.

Example computing devices 1118 include, but are not limited to, personal computers, hand-held or laptop devices, mobile devices, tablets, multiprocessor systems, consumer electronics, mini computers, embedded systems, distributed computing environments that include most any of the above systems or devices, and the like. Computing device 1118 may be substantially any computing device, which may include, for example, tablets (e.g. Galaxy Note®, iPad®, etc.).

The operating environment of FIG. 11 is one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, tablets, and the like, multiprocessor systems, consumer electronics, mini computers, mainframe computers, embedded systems, distributed computing environments that include any of the above systems or devices, and the like.

Generally, embodiments are described in the general context of "computer readable instructions" or modules being executed by one or more computing devices. Computer readable instructions are distributed via computer readable media as will be discussed below. Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

In these or other embodiments, system 1100 may include additional features or functionality. For example, system 1100 may also include additional storage such as removable storage or non-removable storage, including, but not limited to, magnetic storage, optical storage, and the like. Such additional storage is illustrated in FIG. 11 by storage 1114. In certain embodiments, computer readable instructions to implement one or more embodiments provided herein are in storage 1114. Storage 1114 may also store other computer readable instructions to implement an operating system, an application program, and the like. Computer readable instructions may be loaded in memory 1104 for execution by processing unit 1102, for example.

In an aspect, the term "computer readable media" includes computer storage media. Computer storage media includes volatile and nonvolatile, removable and non-removable media implemented in any method or technology for storage of information such as computer readable instructions or other data. Memory 1104 and storage 1114 are examples of computer storage media. Computer storage media includes, but is not limited to, RAM, ROM, EEPROM, flash memory or other memory technology, CD-ROM, Digital Versatile Disks (DVDs) or other optical storage, cloud storage, data server connected to the Internet or most any other medium which may be used to store the desired information and which may be accessed by the computing device of system 1100. Any such storage media may be part of system 1100.

In an embodiment, computer-readable medium includes processor-executable instructions configured to implement one or more embodiments of the techniques presented herein. Computer-readable data, such as binary data including a plurality of zero's and one's, in turn includes a set of computer instructions configured to operate according to one or more of the principles set forth herein. In one such embodiment, the processor-executable computer instructions is configured to perform a method, such as at least a portion of one or more of the methods described in connection with embodiments disclosed herein. In another embodiment, the processor-executable instructions are configured to implement a system, such as at least a portion of one or more of the systems described in connection with embodiments disclosed herein. Many such computer-readable media may be devised by those of ordinary skill in the art that are configured to operate in accordance with the techniques presented herein.

The term computer readable media includes most any communication media. Communication media typically embodies computer readable instructions or other data in a "modulated data signal" such as a carrier wave or other transport mechanism and includes any information delivery media.

While the disclosed system and method has been discussed in connection with use with oscilloscopes and data acquisitions systems, the system and method can be utilized in a large number of instruments used in a variety of technical fields, including devices specialized and optimized for a particular application. For example, the disclosed system and method are useful with waveform monitors for analyzing electric discharges during electric power distribution equipment arcs and faults, air-to-ground and air-to-aircraft lightning strikes, electrostatic discharges (ESD) from human, machine, and material sources, as well as video levels in television productions, medical devices including vital function monitors and electrocardiogram and electroencephalogram instruments or other measuring devices that perform the task of showing the changes in electrical signal waveform data over time in an X-Y display.

What has been described above includes examples of the disclosure. It is, of course, not possible to describe every conceivable combination of components or methodologies for purposes of describing the subject disclosure, but one of ordinary skill in the art may recognize that many further combinations and permutations of the disclosure are possible. Accordingly, the disclosure is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A method for measuring an electrical signal utilizing a data acquisition device, comprising the steps of:
    obtaining a first analog electrical signal waveform with a probe originating from a device under test (DUT);
    altering at least a portion of the first analog electrical signal waveform utilizing a transfer function component to create a second analog electrical signal waveform;
    conveying the second analog electrical signal waveform to the data acquisition device;
    applying an algorithmic inverse transfer function to the second analog electrical signal waveform to restore the first analog waveform; and
    outputting an electrical signal measurement based on the restored first analog waveform.

2. The method for measuring an electrical signal utilizing a data acquisition device of claim 1, wherein the electrical signal exceeds 200 kHz.

3. The method for measuring an electrical signal utilizing a data acquisition device of claim 1, wherein altering at least a portion of the electrical signal waveform comprises compressing the electrical signal waveform that exceeds a measuring capability of the data acquisition device.

4. The method for measuring an electrical signal utilizing a data acquisition device of claim 3, wherein the measuring capability of the data acquisition device comprises a frequency bandwidth, a sampling rate, a voltage range, a voltage resolution or an electrical impedance of the data acquisition device.

5. The method for measuring an electrical signal utilizing a data acquisition device of claim 1, wherein the algorithmic inverse transfer function is an inverse of the transfer function component.

6. The method for measuring an electrical signal utilizing a data acquisition device of claim 1, wherein the data acquisition device comprises an oscilloscope or DAS and outputting the restored electrical signal waveform comprises presenting the restored electrical signal waveform on a display screen of the oscilloscope or DAS.

7. The method for measuring an electrical signal utilizing a data acquisition device of claim 1, wherein at least one of the transfer function component or the algorithmic inverse transfer function are based on a voltage range, a sampling rate, a frequency bandwidth or an electrical impedance of the data acquisition device.

8. The method for measuring an electrical signal utilizing a data acquisition device of claim 1, wherein altering at least a portion of the electrical signal waveform comprises compressing an amplitude portion of the electrical signal waveform.

9. The method for measuring an electrical signal utilizing a data acquisition device of claim 1, wherein the data acquisition device comprises an oscilloscope or a high-speed data acquisition system.

10. The method for measuring an electrical signal utilizing a data acquisition device of claim 1, wherein the transfer function component is implemented utilizing the probe.

11. A system for measuring an electrical signal utilizing a data acquisition device, comprising:
    a probe that obtains a first electrical signal waveform originating from a device under test (DUT) and conveys the first electrical signal waveform to the data acquisition device;
    a transfer function component that alters at least a portion of the first electrical signal waveform;
    an algorithmic inverse transfer function that comprises an inverse of the transfer function component and that restores the altered portion of the first electrical signal waveform.

12. The system for measuring an electrical signal utilizing a data acquisition device of claim 11, wherein the transfer function component compresses a portion of the electrical waveform that exceeds a measuring capability of the data acquisition device.

13. The system for measuring an electrical signal utilizing a data acquisition device of claim 12, wherein the transfer function component compresses an amplitude portion of the electrical signal waveform.

14. The system for measuring an electrical signal utilizing a data acquisition device of claim 12, wherein the measuring capability of the data acquisition device comprises the voltage range or the voltage resolution of the data acquisition device.

15. The system for measuring an electrical signal utilizing a data acquisition device of claim 11, wherein at least one of the transfer function component or the algorithmic inverse transfer function are based on a voltage range, frequency bandwidth or electrical impedance of the data acquisition device.

16. The system for measuring an electrical signal utilizing a data acquisition device of claim 11, wherein the data acquisition device comprises an oscilloscope or a high-speed data acquisition system.

17. The system for measuring an electrical signal utilizing a data acquisition device of claim 11, wherein the data acquisition device includes a display for presenting the electrical signal waveform to a user.

18. The system for measuring an electrical signal utilizing a data acquisition device of claim 11, wherein the transfer function component is implemented utilizing the probe.

19. The system for measuring an electrical signal utilizing a data acquisition device of claim 18, wherein the transfer function component comprises at least one of a diode, a barrier rectifier, a resistor, or a high-frequency, low-voltage operational amplifier.

20. A system for extending a measurement capability of a data acquisition device, comprising:
- a first analog electrical signal waveform originating from a device under test (DUT);
- a transfer function component that alters a portion of the first analog electrical signal waveform that is greater than the measurement capability of the data acquisition device that receives the first waveform;
- an algorithmic inverse transfer function that comprises an inverse of the transfer function component and that restores the altered portion of the first analog waveform.

* * * * *